United States Patent [19]
Anderson

[11] 3,839,672
[45] Oct. 1, 1974

[54] METHOD AND APPARATUS FOR MEASURING THE EFFECTIVENESS OF THE SHIELD IN A COAXIAL CABLE

[75] Inventor: Gene S. Anderson, Batavia, Ill.

[73] Assignee: Belden Corporation, Geneva, Ill.

[22] Filed: Dec. 10, 1973

[21] Appl. No.: 423,452

Related U.S. Application Data

[63] Continuation-in-part of Ser. No. 329,533, Feb. 5, 1973, abandoned.

[52] U.S. Cl. ................................. 324/51, 324/58 A
[51] Int. Cl. ............................................ G01r 31/02
[58] Field of Search ................ 324/51, 52, 54, 58 A

[56] References Cited
UNITED STATES PATENTS

| | | | |
|---|---|---|---|
| 2,176,757 | 10/1939 | Borden | 324/52 |
| 2,362,372 | 11/1944 | Halfmann | 324/54 UX |
| 2,519,407 | 8/1950 | Shive | 324/58 A |
| 2,747,160 | 5/1956 | Bird | 324/58 A |
| 2,881,389 | 4/1959 | Quine | 324/58 A |
| 3,462,682 | 8/1969 | Barnett et al. | 324/54 |
| 3,564,404 | 2/1971 | Eigen | 324/54 |

*Primary Examiner*—Gerard R. Strecker
*Attorney, Agent, or Firm*—Fitch, Even, Tabin & Luedeka

[57] ABSTRACT

A method and apparatus are described for measuring the effectiveness of the shield of a coaxial cable. A first load is connected between the central conductor and the shield of a segment of the coaxial cable. A pair of mutually insulated coaxial tubes are positioned surrounding and substantially coaxial with the segment of coaxial cable and a second load is connected between corresponding ends of the tubes. One of the loads is driven and the leakage through the shield of the coaxial cable is detected by measuring the signal developed across the undriven load.

8 Claims, 5 Drawing Figures

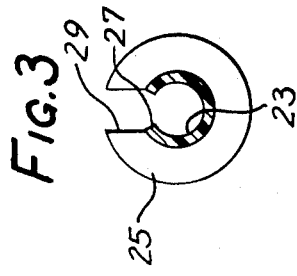
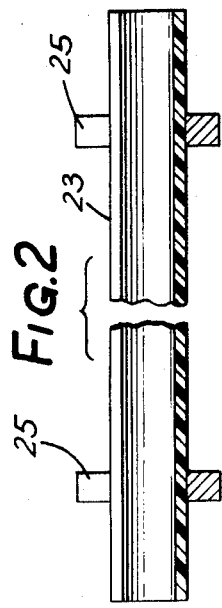
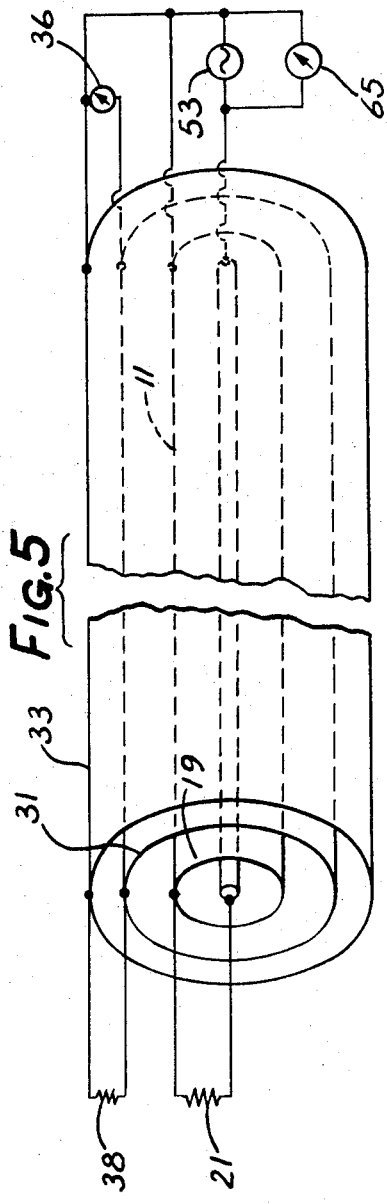

METHOD AND APPARATUS FOR MEASURING THE EFFECTIVENESS OF THE SHIELD IN A COAXIAL CABLE

This application is a continuation-in-part of application Ser. No. 329,533, filed Feb. 5, 1973, now abandoned.

This invention relates generally to an electrical measuring and testing method and apparatus. More particularly, the invention relates to an improved method and apparatus for measuring the effectiveness of the shield in a coaxial cable.

Coaxial cables, in which a central conductor is surrounded by at least one coaxial conductive shield, are typically employed in environments where outside disturbances are prevalent. These disturbances may consist of a changing electric field adjacent the cable, changing magnetic flux, sometimes called near field induction, and electromagnetic induction. The latter type of disturbance is usually associated with very high frequencies which stimulate the disturbed cable to act similarly to an antenna.

The shield employed in a coaxial cable may be of any suitable type, depending upon the desired level of shielding, required flexibility of the cable, desired cable cost, and desired cable diameter. In order to determine the effectiveness of the shielding, a number of different methods and apparatus are known. One particular technique which has been in use for this purpose is to measure the surface transfer impedance by the return current path outside of the shield. The longitudinal voltage along the inside surface of the shield over a given increment of its length may then be measured. By determining its attenuation, the surface transfer impedance in units of impedance per unit length may be determined. The surface transfer impedance method, however, has been unreliable since the apparent value of shield effectiveness is inversely related to the d-c resistance of the shield. Moreover, practical limitations in the use of surface transfer impedance techniques have placed an upper limit on the frequency range over which such measurements can be effected.

Other methods and apparatus for measuring coaxial cable shield effectiveness have been largely unsuccessful. High cost, complex equipment, and complex data relationships have typified such prior art systems.

It is an object of the present invention to provide an improved method and an improved apparatus for measuring the effectiveness of the shield in a coaxial cable.

Another object of the invention is to provide a method and apparatus, for measuring coaxial cable shield effectiveness, which are simple in operation and construction.

It is another object of the invention to provide a method and apparatus, for measuring coaxial cable shield effectiveness, which are reliable and capable of measuring effectiveness over a wide range of frequencies.

Other objects of the invention will become apparent to those skilled in the art from the following description, taken in connection with the accompanying drawings wherein:

FIG. 2 is a full section side view of a portion of the apparatus of the invention which is not illustrated in FIG. 1;

FIG. 3 is an end view of the portion shown in FIG. 2;

FIG. 4 is an elevational view illustrating the manner in which the segment of test coaxial cable is connected electrically; and FIG. 5 is a schematic view illustrating the electrical connections employed in the method and apparatus of the invention.

Figure 1:
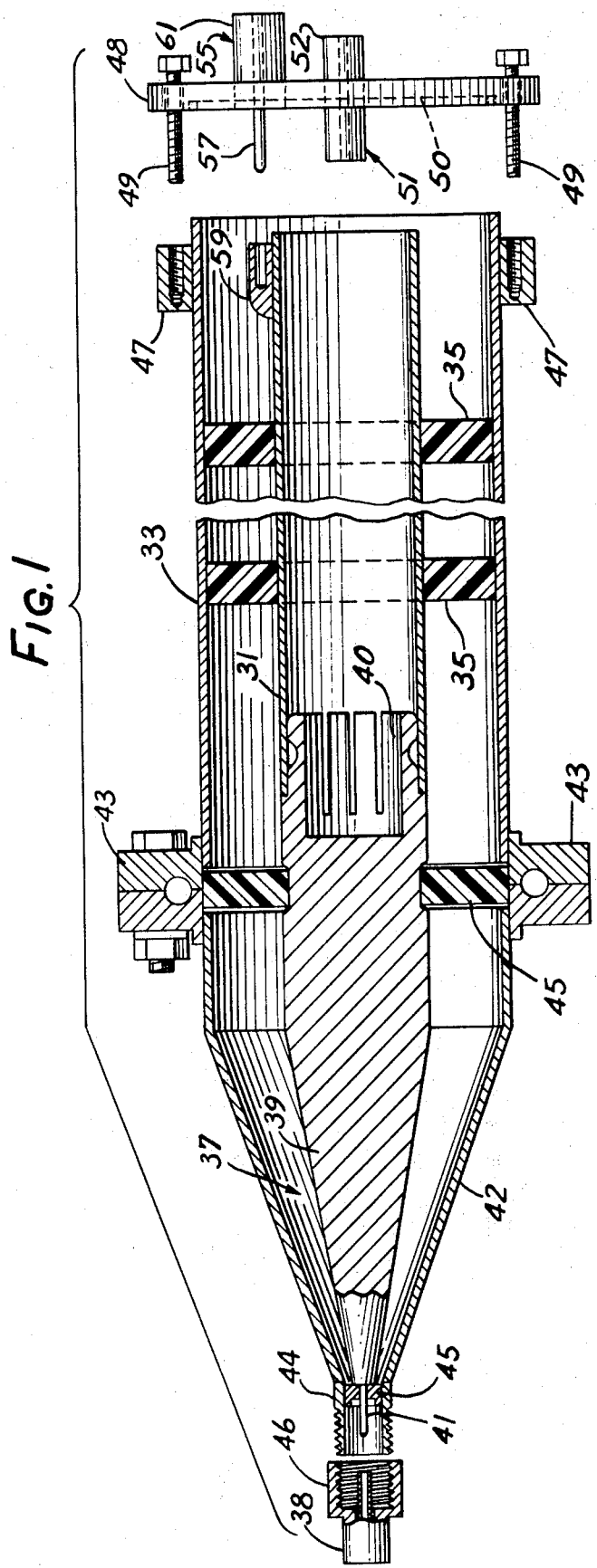
FIG. 1 is a full section side view of apparatus constructed in accordance with the invention.

Very generally, in employing the method and apparatus of the invention, a segment of the coaxial cable is terminated by connecting its characteristic impedance between its central conductor and its shield. A pair of coaxial conductive tubes are placed surrounding the coaxial cable and are connected together at corresponding ends by a resistor. An a-c signal is applied either to the unterminated end of the cable, or to the corresponding ends of the tubes opposite the resistor, and leakage through the shield is detected by measuring the potential developed across the undriven resistor. The input and detected signals may be compared to determine the leakage of the shield.

The method of the invention can best be understood by first describing one form of the apparatus of the invention which is utilized. A segment 11 of the coaxial cable to be tested, which may be a length of a CATV drop cable, for example, about 36 inches long, is provided with BNC type coaxial connectors 13 and 15 at opposite ends.

The cable 11 is terminated by coupling a shielded load resistor 21 to one of the BNC connectors (i.e. the resistor is connected between the cable's central conductor 17 and the cable's shield 19). The value of the resistor 21 is selected to match the characteristic impedance of the cable.

The assembly of the test cable segment 11, the connectors 13 and 15, and the load resistor 21 is then placed in a centering device in the form of a tube 23 of insulating material, such as plastic. Preferably, the interior diameter of the insulating tube 23 is made less than about twice but greater than the outer diameter of the test cable, and of a length such that the BNC connectors 13 and 15 are disposed just beyond opposite ends of the tube 23. For example, for a three foot cable, the tube is about 34 inches long. The insulating tube 23 is provided with a plurality of washer shaped spacers 25 of insulating material, such as nylon, spaced axially along the length of the tube and suitably secured thereto. Both the insulating tube 23 and the spacers 25 are provided with axially extending slots 27 and 29, respectively, so as to enable the test cable to be readily disposed in the tube 23.

The assembly of the test cable segment, the connectors 13 and 15, the load resistor 21, the tube 23 and the spacers 25 is then placed inside a second coaxial system which serves to detect leakage signals from the cable, as will be described. The second coaxial system includes a detector 31 comprising an inner conductive tube of copper having an inner diameter sufficiently greater than the diameter of the cable so as not to be affected by induction or near field leakage and of a length such as to extend substantially beyond the ends of the connectors 13 and 15 attached to cable 11. For example, for a test coaxial cable 11 having a length of three feet and a diameter of about ¼ inch, the conductive inner tube is about five feet long and about 1 inch in diameter.

The spacers 25 which have an outer diameter slightly smaller than the inner diameter of the inner conductive tube 31, engage the inner surface of the conductive tube 31 and therefore position the test cable segment approximately along the axis of the inner conductive tube 31. The second coaxial system further includes means for shielding the inner conductive tube 31 from external fields which is in the form of an outer conductive tube 33 of copper which is slightly longer than the inner tube 31. The outer tube 33 is positioned coaxially of the inner conductive tube 31 and spaced therefrom by means of a plurality of annular spacers 35 of insulating material.

The spacing between the outer and inner conductive tubes 31 and 33 is selected so as to produce a characteristic impedance which matches the input impedance of a monitor or measuring meter 36, described hereinafter, normally as 50 ohms, which is connected between corresponding ends of the inner tube 31 and the outer tube 33. For example, to obtain a 50 ohm characteristic impedance, the inner diameter of the outer conductive tube 33 is selected so as to be 2.3 times the outer diameter of the inner conductive tube 31.

In order to further prevent external fields from affecting the measurement and to terminate the second coaxial system with its characteristic impedance, a tapered end adapter 37 is connected by its large end to the inner and outer tubes 31 and 33 and a shielded load resistor 38 is connected to the small end of the adapter 37. The end adapter 37 includes a solid tapered inner plug 39 of conductive material which is provided with a split sleeve 40 at its inner end to fit within and make contact with the inner tube 31 and is tapered toward its outer end which is provided with a conductive pin 41. The end adapter 37 further includes an outer tapered tube 42 of conductive material, the larger diameter end of which is mechanically and electrically connected to the outer tube 33 by a bolted flange 43 of conductive material. The tapered tube 42 is tapered toward its outer end which is provided with a threaded tube 44, of conductive material. The solid plug 39 is supported within the outer tube 42 by a pair of spacers 45 of insulating material. The tube 44 and pin 41 are proportioned to receive a type N female connector 46 which is connected to the shielded resistor 38, whereby the shielded resistor is connected between the inner plug 39 and the outer tapered tube 42. The ratio between the inner diameter of the outer tapered tube 42 and the outer diameter of inner plug 39 is maintained constant along the length of the adapter to retain the characteristic impedance of the second coaxial system. In this connection, to retain the 50 ohm characteristic impedance the ratio is maintained at 2.3.

At the opposite end of the assembly, the outer conductive tube 33 is provided with a plurality of conductive bosses 47, attached to the outer surface of the outer conductive tube 33. A conductive circular end plate 48 is secured over the unterminated end of the outer conductive tube 33 by means of suitable machine screws 49 which enter appropriately threaded holes in the bosses 47. An annular recess 50 is provided in the inner surface of the plate 48 for receiving the unterminated end of the outer conductive tube 33.

A coaxial powered connector 51 of the BNC type extends through an opening in the center of the plate 48 and the outer conductor 52 thereof is electrically coupled to the plate. Before securing the end plate 48, the powered connector 51 is connected to the BNC connector 13 on the cable 11. Thus, by connecting a source 53 of a-c signals, such as an oscillator capable of providing frequencies in the range of 1 to 500 MHZ, to the powered connector 51, an a-c signal is applied to the input end of the sample cable 11.

Completing the electrical connection is a further coaxial monitoring connector 55, such as a conventional panel receptacle, the outer coaxial conductor 61 of which is electrically connected to the plate. The central conductive pin 57 of the connector 55 which extends through and is insulated from the end plate 48, connects with a suitable receptacle formed in a boss 59 conductively attached to the outer surface of the inner conductive tube 31. Thus, the potential difference between the inner conductive tube 31 and the outer conductive tube 33 may be measured by a meter 36, such as a vacuum tube voltmeter, connected to the monitoring connector 55. As the outer conductor 52 of the powered connector 51 and the outer conductor 61 of the monitoring connector 55 are both electrically connected through the plate 48 to the outer conductive tube 33, the outer conductive tube serves as a common reference for both the cable 11 and the inner conductive tube 31.

With all elements in assembled condition, the apparatus and test cable segment assume the electrical condition shown schematically in FIG. 5. The variable frequency a-c source 53 applies an a-c signal to the input end of the test cable 11. The level of this signal is measured by a meter 65, such as a vacuum tube voltmeter. The second meter 36, which is connected between the inner and outer tubes 31 and 33, measures the signal across the tubes.

In operating the apparatus of the invention in accordance with the method of the invention, the sample test cable segment 11 is prepared by assembling the connectors 13 and 15 at each end. The load resistor 21 is then connected to terminate the test cable with its characteristic impedance. The test cable segment 11 is then positioned in the insulating tube 23 and the BNC connector 13 is then connected to the BNC powered connector 51 on the cover plate 48. The cover plate 48 is then positioned on the end of the outer tube 33 thereby positioning the insulating tube 23 within the inner conductive tube 31. The mounting screws 49 are tightened. The signal source 53 is then connected to the powered connector 51 and energized to apply a signal to the test cable. The level of signal picked up by the tube 31 is then measured by the meter 38.

The difference of the meter readings between the meter 65 and the meter 36 is the shield effectiveness or isolation of the test cable segment at the particular frequency of the source 53. By varying the frequency of the source, the cable may be tested over a desired frequency range and the resulting shield effectiveness plotted against frequency. Although illustrated with visual monitoring, the apparatus of the invention may be operated automatically by suitable frequency scanning and monitoring equipment.

Although the actual numerical signal level of shield effectiveness may not be representative due to various resonances in the system, results are reproducible from one identical test fixture to another. Relative differences between various cables may then be clearly revealed by the plotted monitored data.

Under some circumstances, the coaxial cable being tested may have a shield effectiveness so high as to severely limit the amplitude of the signal which is measured in the meter 36. This problem may be readily overcome by merely slightly altering the apparatus so that the shielded resistor 38 is driven and so that the leakage signal is detected by measuring the signal across the load 21. To this end, the a-c signal source 53 having an input impedance which matches the characteristic impedance of the second coaxial system is placed in the position of the meter 36, and the meter 36 with an input impedance that matches the cable under test is placed in the position of the a-c signal source 53. Of course, the meter 65 is connected in parallel with the a-c source 53 as before. In this arrangement, a voltage may be applied to the outer tubes which would, if applied to the coaxial cable, cause break down. Thus, the measurement of leakage through the shield of the coaxial cable may be accomplished at a higher amplitude.

It may therefore be seen that the invention provides an effective method and apparatus for measuring the effectiveness of the shield in a coaxial cable. The apparatus and method are simple and reliable and are capable of measuring shield effectiveness over a wide range of frequencies. Frequency range of 1 to 500 MHz or even greater are capable of effective measurement by means of the method and apparatus of the invention.

Various modifications of the invention will become apparent to those skilled in the art from the foregoing description and accompanying drawings. Such modifications are intended to fall within the scope of the appended claims.

What is claimed is:

1. A method for measuring the effectiveness of the shield in a segment of coaxial cable, comprising, connecting a first load between the conductor and the shield of the cable segment at one end thereof, positioning a pair of mutually insulated coaxial tubes of different diameters telescoped with respect to each other surrounding and substantially coaxial with the coaxial cable segment, connecting a second load between corresponding ends of the tube, driving one of the loads by applying an a-c signal thereto at the end opposite that at which the driven load is connected, and detecting the leakage of the applied signal through the shield by measuring the signal developed across the undriven load.

2. A method according to claim 1 wherein the first load is driven and wherein the leakage is detected by measuring the signal between the coaxial tubes at the end of the tubes opposite the second load.

3. A method according to claim 1 wherein the second load is driven and wherein the leakage is detected by measuring the signal between the shield and the conductor at the end of the segment opposite the first load.

4. Apparatus for measuring the effectiveness of the shield in a segment of coaxial cable, comprising, means for connecting a first load between the conductor and the shield of the cable segment being tested at one end thereof, a pair of mutually insulated coaxial tubes of different diameters telescoped with respect to each other surrounding and substantially coaxial with the coaxial cable segment, a second load connected between corresponding ends of the tubes, means for driving one of the loads by applying an a-c signal thereto at the end opposite that at which the said driven load is connected, and means for detecting the leakage of the applied signal through the shield by measuring the signal developed across said undriven load.

5. Apparatus according to claim 4 wherein said driving means is connected to the conductor and the shield of said cable segment, and wherein said detecting means is connected to said coaxial tubes at the end thereof opposite said second load.

6. Apparatus according to claim 4 wherein said driving means is connected to the ends of said tubes opposite said second load to drive said second load, and wherein said detecting means is connected between the shield and the conductor of said segment at the end thereof opposite said first load.

7. Apparatus according to claim 4 including conductive means for closing the ends of the outermost one of said tubes.

8. Apparatus according to claim 4 including a plastic tube for coaxially enclosing and surrounding the cable segment, and a plurality of non-conductive spacers for supporting said plastic tube in spaced relation to the innermost one of said tubes.

* * * * *